United States Patent [19]

Fellows

[11] Patent Number: 6,110,614
[45] Date of Patent: Aug. 29, 2000

[54] ELECTRIC POWER GENERATION SYSTEM USING FUEL CELLS

[75] Inventor: Richard Griffith Fellows, Loughborough, United Kingdom

[73] Assignee: BG, plc, Reading, United Kingdom

[21] Appl. No.: 09/284,240

[22] PCT Filed: Oct. 14, 1997

[86] PCT No.: PCT/GB97/02835

§ 371 Date: May 11, 1999

§ 102(e) Date: May 11, 1999

[87] PCT Pub. No.: WO98/16961

PCT Pub. Date: Apr. 23, 1998

[30] Foreign Application Priority Data

Oct. 16, 1996 [GB] United Kingdom ............... 9621540

[51] Int. Cl.⁷ ................................................. H01M 8/18
[52] U.S. Cl. .............................. 429/19; 429/34; 429/39; 429/30
[58] Field of Search .................... 429/19, 34, 39, 429/30, 17, 12

[56] References Cited

U.S. PATENT DOCUMENTS

| | | | |
|---|---|---|---|
| 3,718,506 | 2/1973 | Fischer et al. ........................ | 136/86 C |
| 4,182,795 | 1/1980 | Baker et al. .............................. | 429/13 |
| 4,808,491 | 2/1989 | Reichner .................................. | 429/13 |
| 5,047,299 | 9/1991 | Shockling ................................ | 429/20 |
| 5,200,278 | 4/1993 | Watkins et al. .......................... | 429/24 |
| 5,360,679 | 11/1994 | Buswell et al. .......................... | 429/19 |

*Primary Examiner*—Maria Nuzzolillo
*Assistant Examiner*—Raymond Alejandro
*Attorney, Agent, or Firm*—Oblon, Spivak, McClelland, Maier & Neustadt, P.C.

[57] ABSTRACT

An electric power generation system using fuel cells, wherein the system includes a stack of fuel cells each having an anode, electrolyte and a cathode. Associated with the anodes are anode passageways divided into two groups. Each group is formed by anode passageways connected to one of the two anode gas exhaust manifolds. Associated with the cathodes are cathode passageways divided into two groups. Each group is formed by cathode passageways connected to one of the two cathode gas exhaust manifolds. The anode exhaust gas in each of the manifolds is maintained completely separate from that in the other manifold. Similarly, the cathode exhaust gas is separate in the two manifolds. Fuel gas from a supply is fed to an inlet manifold supplying all of the anode passageways in which the reforming reaction takes place. Anode exhaust gas from the outer manifold is supplied to the inlet manifold to mix with the fuel gas to the anode passageways. Oxidizing gas such as air is fed to an inlet manifold supplying all of the cathode passageways. Cathode exhaust gas from the outlet manifold is supplied to the oxidizing gas supply path.

20 Claims, 4 Drawing Sheets

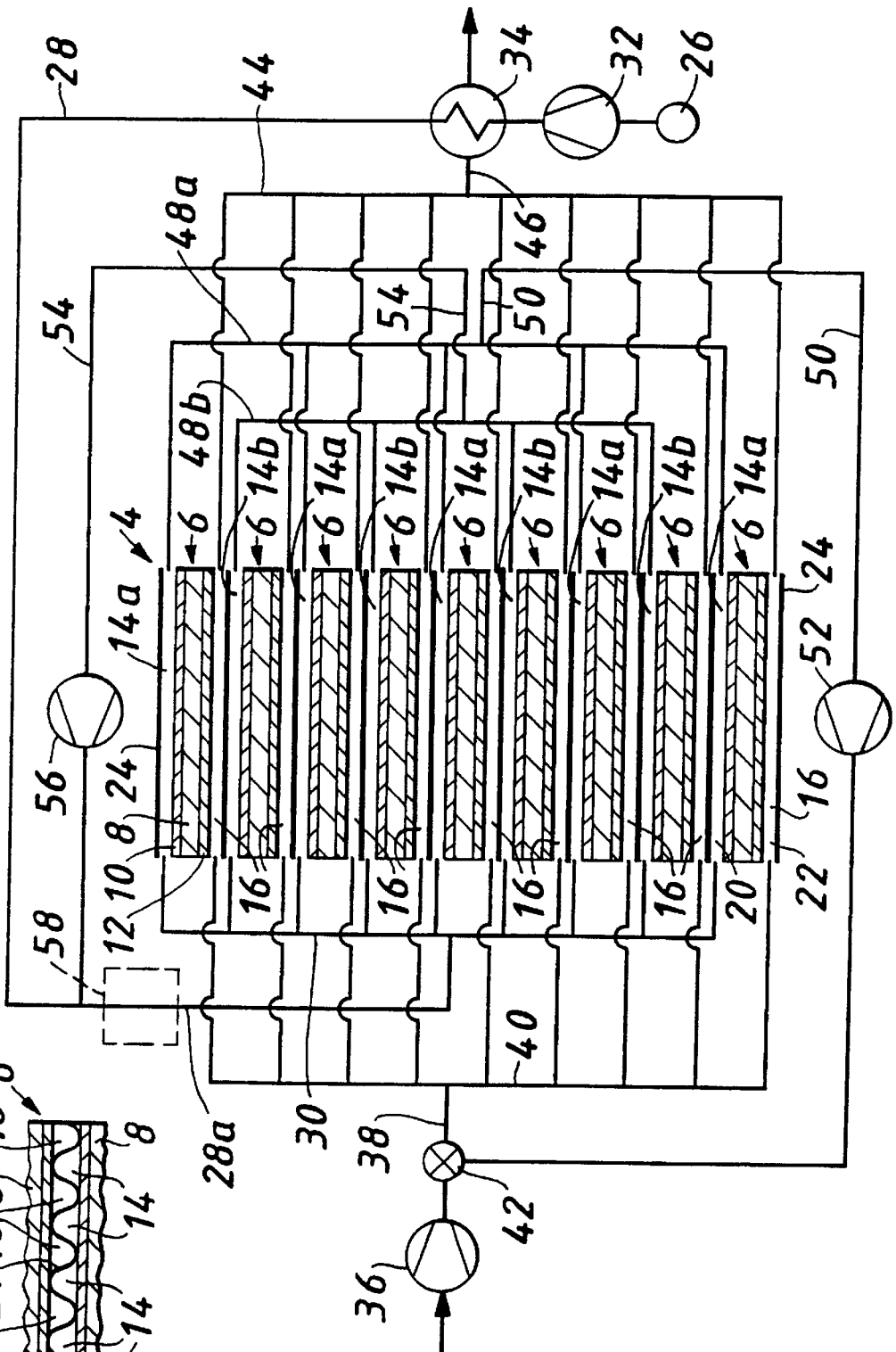
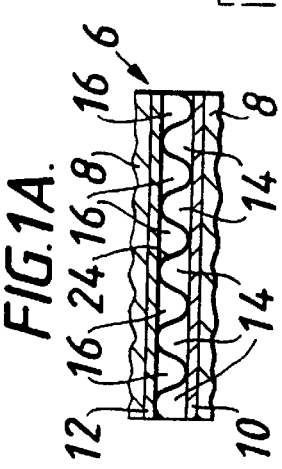

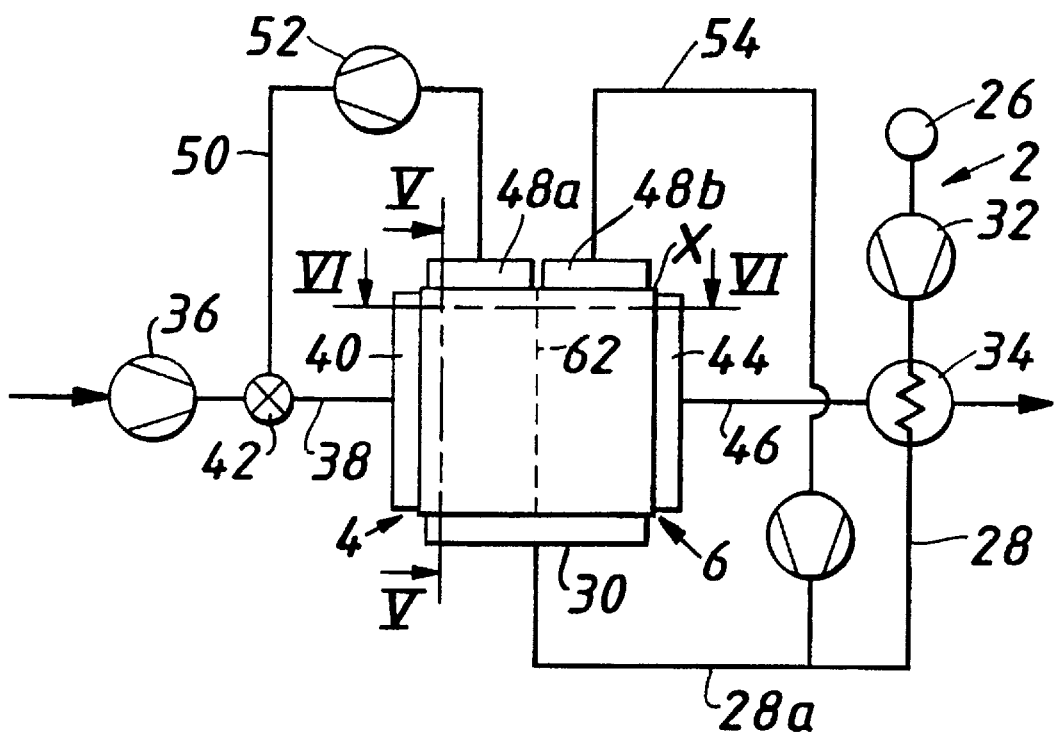
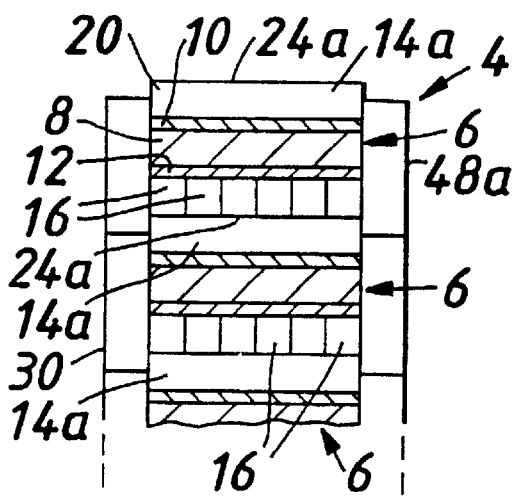
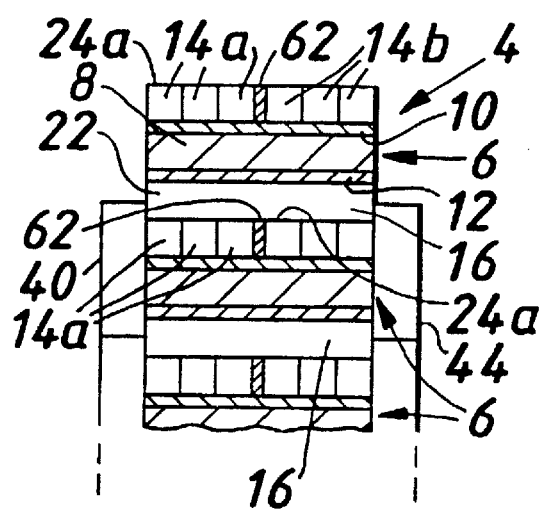

6,110,614

ELECTRIC POWER GENERATION SYSTEM USING FUEL CELLS

BACKGROUND OF THE INVENTION

Field of the Invention

This invention relates to an electric power generation system comprising a plurality of fuel cells electrically connected to to another, for example as a stack of fuel cells.

SUMMARY OF THE INVENTION

According to the invention an electric power generation system comprises a plurality of fuel cells electrically connected one to another, said fuel cells comprising anodes and cathodes, a plurality of first passage means associated with and defined at least in part by said anodes, a plurality of second passage means associated with and defined at least in part by said cathodes, third passage means connected to inlets to said first passage means for said third passage means to supply said first passage means and associated anodes with fuel gas, fourth passage means connected to inlets to said second passage means to supply said second passage means and associated cathodes with oxidizing gas, the arrangement being such that either (i) anode exhaust gas from a first group of said first passage means is kept separate from anode exhaust gas from a second group formed by a plurality of other passages of said first passage means and fifth passage means being provided to convey said anode exhaust gas from said second group of said first passage means to the third passage means for supply with said fuel gas to the inlets to said first passage means or (ii) cathode exhaust gas from a first group of said second passage means is kept separate from cathode exhaust gas from a second group formed by a plurality of other said second passage means and sixth passage means being provided to convey said cathode exhaust gas from said second group of said second passage means to the fourth passage means for supply with said oxidizing gas to the inlets to said second passage means, or the arrangement being such that anode exhaust gas from a first group of said first passage means is kept separate from anode exhaust gas from a second group formed by a plurality of other said first passage means and fifth passage means being provided to convey said anode exhaust gas from said second group of said first passage means to the third passage means for supply with said fuel gas to the inlets to said first passage means and cathode exhaust gas from a first group of said second passage means is kept separate from cathode exhaust gas from a second group formed by plurality of other said second passage means and sixth passage means being provided to convey said cathode exhaust gas from said second group of said second passage means to the fourth passage means for supply with said oxidizing gas to the inlets to said second passage means.

BRIEF DESCRIPTION OF THE DRAWINGS

The invention will now be further described, by way of example, with reference to the accompanying drawings in which:

FIG. 1, which is partly in section, diagrammatically illustrates an embodiment of an electric power generation system formed according to the invention;

FIG. 1A is a section of a fragment of two adjacent fuel cells in the system in FIG. 1, taken at right angles to the plane of FIG. 1;

FIG. 4 is a diagrammatic illustration of a plan view of yet another embodiment of an electric power generation system formed according to the invention, comparable with the embodiment in FIG. 1, but comprising a cross-flow stack of fuel cells;

FIG. 5 is a diagrammatic illustration of a fragment of the stack taken along line V—V in FIG. 4, and FIG. 6 is a diagrammatic illustration of a fragment of the stack taken along line VI—VI in FIG. 4.

DETAILED DESCRIPTION OF THE PREFERRED EMBODIMENTS

Figure 2:
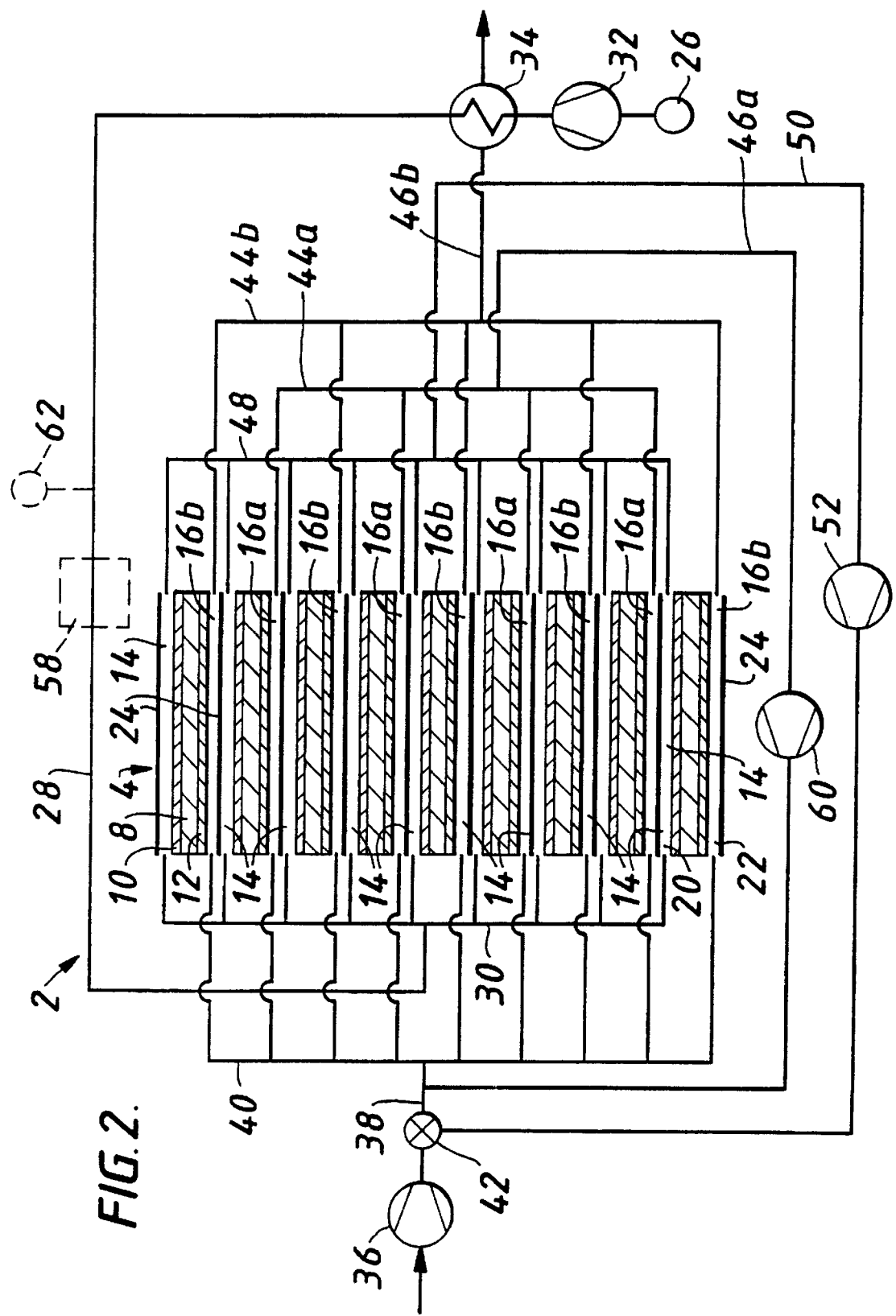
FIG. 2 which is partly in section, diagrammatically illustrates another embodiment of an electric power generation system formed according to the invention.

In the drawings like references identify like or comparable parts.

BEST MODE FOR CARRYING OUT THE INVENTION

With reference to FIGS. 1 and 1A, an electrical power generation system 2 comprises a plurality or stack 4 of fuel cells 6 electrically connected one to another in known manner for their electromotive forces to be additive. Each fuel cell 6 comprises electrolyte 8, an anode 10, and a cathode 12. Associated with the anodes 10 are passages or passageways (herein called anode passages) generally identified herein by the numeral or prefix numeral 14, some of which anode passages are specifically identified by references 14a and the others by the references 14b. Associated with the cathodes 12 are passages or passageways (herein called cathode passages) generally identified herein by the numeral or prefix numeral 16. Each anode passage 14 has a respective inlet 20, and each cathode passage 16 has a respective inlet 22. The anode and cathode passages 14 and 16 are defined at least in part by the adjacent anode or cathode and at least in part by a partition or wall 24 of successive generally reverse direction sections; the wall 24 being exemplified in FIG. 1A by a wall of a zigzag or undulating form.

Although the fuel required at the anodes 10 is hydrogen, it should be understood that the expression fuel gas used herein embraces both hydrogen and gaseous raw material from which hydrogen fuel is derived, for example an hydrocarbon, in the course of operating the system.

The stack of fuel cells 4 is maintained at desired temperature and pressure appropriate to the electrolyte 8 and the nature of the fuel gas, initially supplied from a fuel gas supply 26 to a supply path 28 feeding an inlet manifold 30 supplying fuel gas to the inlets 20 of the anode passages 14a, 14b. At the upstream end the supply path 28 comprises a pump or blower 32 and a heat exchanger 34 to add heat to the fuel gas being supplied through the path 28.

The fuel cells 6 may be of a solid oxide type having a solid oxide electrolyte 8 or may be of a molten carbonate type having a molten carbonate electrolyte.

Oxidizing gas, for example air from atmosphere, is supplied by a pump or blower 36 to a supply path 38 feeding an inlet manifold 40 supplying the oxidizing gas to the inlets 22 to the cathode passages 16. The supply path 38 comprises a gas heating arrangement 42 comprising burner means to burn a gaseous fuel supplied thereto to heat the oxidizing gas which in the case of air provides some oxygen to support combustion of the gaseous fuel which heats the remaining oxygen supplied to the cathode passages 16.

Cathode exhaust gas leaves the cathode passages 16 through a cathode exhaust manifold 44 feeding an outlet path 46 comprising the heat exchanger 34 in which heat is extracted from the cathode exhaust gas and added to the fuel gas.

Figure 3:
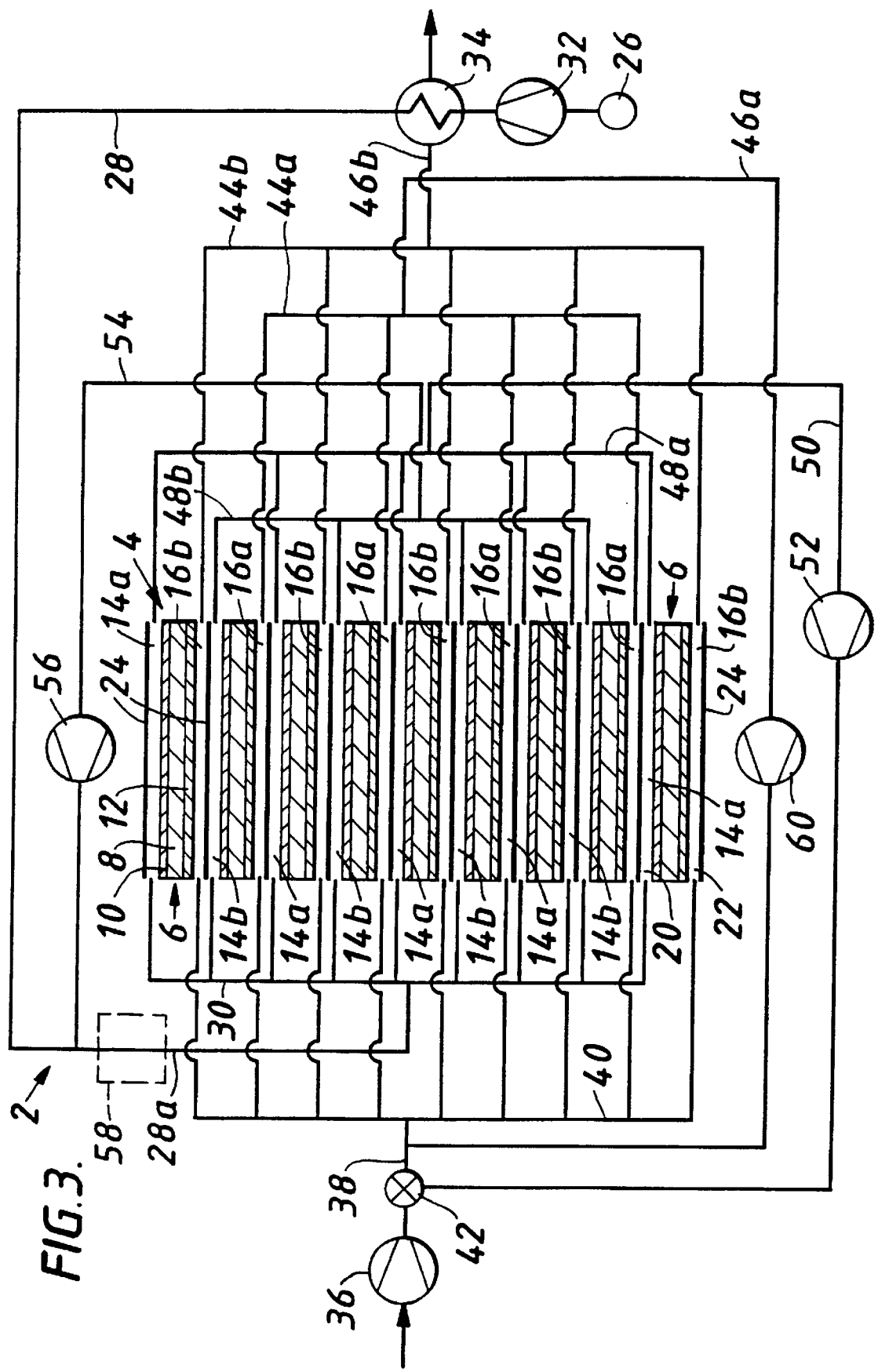
FIG. 3 which is partly in section, diagrammatically illustrates a further embodiment of an electric power generation system formed according to the invention.

Anode exhaust gas leaving the anode passages 14 is divided into two parts. The anode passages 14a feed anode exhaust gas therefrom directly into an anode exhaust manifold 48a. The anode passages 14b feed anode exhaust gas therefrom directly into an anode exhaust manifold 48b. In FIGS. 1 and 3 the anode passages 14a are in fuel cells which alternate with the fuel cells having the anode passages 14b. By means of the manifolds 48a and 48b the anode exhaust gas from one group of alternate fuel cells 6 is kept wholly separate from the anode exhaust gas from the other group of alternate fuel cells. So the anode exhaust gas from the fuel cell stack 4 is in portions which have never been mixed together.

The exhaust manifold 48a feeds its anode exhaust gas to a supply path 50 comprising a pump or blower 52 feeding the anode exhaust gas in the path 50 as the gaseous fuel to the burner means in the heating arrangement 42.

The exhaust manifold 48b feeds its anode exhaust gas to a supply path 54 comprising a pump or blower 56 feeding the anode exhaust gas in the path 54 to a downstream portion 28a of the supply path 28. Thus a first portion of the anode exhaust gas is used as fuel by the heating arrangement 42 and a second portion of the anode exhaust gas is mixed with the fresh fuel gas in the path 28 and the mixture supplied to the inlet manifold 30 and therefrom to all the anode passages 14a and 14b.

The fuel gas from the supply 26 is at least one hydrocarbon capable of being reformed into molecular hydrogen for use as fuel by the fuel cells 6, for example the fuel gas may be natural gas which may be substantially methane. Preferably the reforming reaction takes place in the anode passages 14a, 14b provided with suitable reforming catalyst means known per se. The anode passages 14b may be constructed to present less flow resistance than the anode passage 14a, for example the passages 14b may be of larger cross-section. Thus the mass flow rate of gas along the anode passages 14b is greater than along the anode passages 14a. One effect of this is that the amount of unconsumed hydrogen in the anode exhaust gas from the anode passage is greater than that in anode exhaust gas from the anode passages 14a. This hydrogen richer portion of the anode gas is re-circulated by the path 54 and added to the fresh fuel gas and thus increases the amount of hydrogen ultimately available as fuel in the anode passages 14a and 14b. As a result the Nernst voltages increase and fuel cell electrical resistance decreases. The electrical current output thus increases and this is achieved, without a overheating of the stack 4, in part because the greater gas flows in the passages 14b has an increased cooling effect. Another effect is a better temperature distribution across the stack 4 from the inlet ends of the passages 14a, 14b, 16 to the outlet ends thereof. By "better" is meant that the temperature difference between maximum and minimum tempertures in the stack 4 is less than in conventional systems which experience a temperature dip at the inlet ends of the anode passages due to the endothermic nature of the reforming reaction which takes place to a greater extent at the inlet ends than further along the anode passages. Adding the hydrogen richer higher flow rate portion of the anode exhaust gas to the fuel gas about to be supplied to the anode passages 14a, 14b reduces the hydrocarbon concentration in the mixture relative to that in the fuel gas alone. The reduction in hydrocarbon concentration may be great. Reduction in hydrocarbon concentration lowers the reforming reaction rate at the inlet ends 20 of the anode passages 14a, 14b and thus the amount of heat extracted there by the endothermic reaction, and so the aforesaid temperature dip may be eliminated or at least reduced. Also a further improvement in temperature distribution across the stack may be achieved by grading the reforming catalyst means along the anode passages 14a and 14b to produce a more uniform rate of reforming reaction along the anode passages. For example, the amount or effective amount of the reforming catalyst means may increase per unit length from the inlet end to outlet end of each anode passage, the increase may be progressive or in increments.

The gas flow rate through the anode passages 14b may also be varied by varying the speed of the blower 56.

If desired the reforming reaction may be carried out upstream of the anode passages 14a and 14b, for example in reforming means 58 which may be sensible heat reforming means, provided in the path portion 28a downstream of the junction between the paths 28 and 54.

In the system in FIG. 2, the cathode passages consist of cathode passages 16a and 16b, the passages 16a being in certain fuel cells of the stack 4 which alternate with the other fuel cells in the stack. The cathode exhaust gas from the cathode passages 16a feeds to a cathode exhaust manifold 44a which is wholly separate from that portion of the cathode exhaust gas from the cathode passages 16b which is fed to a cathode exhaust manifold 44b feeding, via a path 46b, to the heat exchanger 34. The portion of the cathode exhaust gas from the cathode passages 16a is fed, via the manifold 44a, to a path 46a which includes a pump or blower 60 and adds that cathode exhaust gas to the supply path 38 between the heating arrangement 42 and the inlet manifold 40 to mix with the oxidizing gas. The mass flow rate of gas through the cathode passages 16a may differ from that through the cathode passages 16b and may be greater.

The anode exhaust gas from all the anode passages 14 feeds into an anode exhaust manifold 48 from which the anode exhaust gas is fed to the supply path 50 which supplies the anode exhaust gas, via the blower 52, to the burner means in the heating arrangement 42.

Instead of the reforming reaction taking place in the anode passages 14, it may take place in the reforming means 58 and water in suitable form may be supplied by water supply means 62.

In FIG. 3 the system 2 is a combination of the systems in FIGS. 1 and 2 in that the anode exhaust gas is output in two wholly separate portions as is the cathode exhaust gas. Instead of the reforming reaction taking place in the cathode passages 14a and 14b it may take place in the reforming means 58.

In the system in FIGS. 4 to 6 walls 24a forming at least part of the anode passages 14a, 14b and the cathode passages 16 do not have to be of the zigzag or undulating form of the walls 24 in FIGS. 1 to 3. The anode passages 14a and 14b extend cross-wise to the cathode passages, thus the flow of fuel gas in the anode passages is transverse or cross-flow to that of the oxidizing gas in the cathode passages. While there may be only a single anode passage 14a on one side of a fluid-tight partition or wall 62 and a single anode passage 14b on the other side of the partition 62, there can also be a plurality of anode passages 14a on one side of each partition 62 separated from a plurality anode passage 14b on the other side of each partition 62 as exemplified in FIG. 6. The anode passages 14a feed into the common anode exhaust manifold 48a separate from the common anode exhaust manifold 48b which receives the anode exhaust gas from the anode passages 14b. In any fuel cell 6 in FIGS. 4 to 6 comprising a plurality of anode passages 14a and a plurality of anode passages 14b, the partition 62 may be omitted.

In a conventional cross-flow fuel cell stack there is a tendency to form a hot spot at the corner region that is furthest from both the inlets for fuel gas and oxidizing gas. If the stack 4 in FIG. 4 were a known fuel cell stack that hot spot region would occur at the corner indicated by X.

In the system in FIGS. 4 to 6 upstream portions of the cathode passages 16 are in close thermal contact with the anode passages 14a, and downstream portions of the cathode passages are in close thermal contact with the anode passages 14b.

Development of a hot spot at corner region X in the system in FIGS. 4 to 6 is reduced or prevented by the cooling effect of (i) the greater mass flow rate of gas through the anode passages 14b, and/or (ii) the endothermic reforming reaction which can be encouraged to take place in downstream portions of the anode passages 14b and optionally 14a by the effect of grading the reforming catalyst means along the anode passages. Thus a favourable stack efficiency and temperature distribution may be achieved.

If desired the blower 52 may be omitted from any embodiment described above.

In the embodiments described above planar stacks of fuel cells are used, but the invention may also be applied to systems in which the stacks of fuel cells are of a tubular type.

What is claimed is:

1. An electric power generation system, comprising a plurality of fuel cells electrically connected to one another, said fuel cells comprising anodes and cathodes, a plurality of first passageways associated with and defined at least in part by said anodes and having respective inlets, a plurality of second passageways associated with and defined at least in part by said cathodes and including respective inlets, third passageways connected to said inlets of said first passageways for said third passageways to supply said first passageways and said anodes with fuel gas, fourth passageways connected to said inlets of said second passageways to supply said second passageways and said cathodes with an oxidizing gas, wherein either;

(i) anode exhaust gas from a first group of said first passageways is kept separate from anode exhaust gas from a second group formed by a plurality of said other of said first passageways and fifth passageways provided to convey said anode exhaust gas from said second group of said first passageways to the third passageways for supply said fuel gas to the inlets of said first passageways or (ii) cathode exhaust gas from a first group of said second passageways is kept separate from exhaust gas from a second group formed by a plurality of other said second passageways and sixth passageways being provided to convey said cathode exhaust gas from said second group of said second passageways to the fourth passageways for supplying said oxidizing gas to the inlets to said second passageways, or the arrangement being such that anode exhaust gas from a first group of said first passageways is kept separate from anode exhaust gas from a second group formed by a plurality of other of said first passageways and fifth passageways being provided to convey said anode exhaust gas from said second group of said first passageways to the third passageways for supply with said fuel gas to the inlets to said first passageways and cathode exhaust gas from a first group of said second passageways is kept separate from cathode exhaust gas from a second group formed by a plurality of other of said second passageways and sixth passageways being provided to convey said cathode exhaust gas from said second group of said second passageways to the fourth passageways for supply with said oxidizing gas to the inlets to said second passageway.

2. A system as claimed in claim 1, in which the anode exhaust gas emerging from the first group of said first passageways has a first composition which differs from a second composition of the anode exhaust gas emerging from the second group of said first passageways.

3. A system as claimed in claim 2, in which the anode exhaust gas emerging from the second group of said first passageways contains a first amount of hydrogen than an anode exhaust gas emerging from the second group of said first passageways contains a second amount of hydrogen, wherein said first amount of hydrogen is greater than that of said second amount of hydrogen.

4. A system as claimed in claim 1 in which the mass flow rate of gas through the second group of said first passageways is greater than the mass flow rate of gas through the first group of said first passageways.

5. A system as claimed in claim 1 in which the fuel gas comprises at least one hydrocarbon gas which is convertible to molecular hydrogen by a reforming reaction.

6. A system as claimed in claim 5, in which the reforming reaction takes place in the first passageways and said first passageways comprise a plurality of passageways containing reforming reaction catalyst in an amount which is graded or varied along one or more of said first passageways.

7. A system as claimed in claim 6, wherein said first passageways have outlets for passage of anode exhaust gas therefrom, in which an amount of the reforming reaction catalyst increases per unit length along said passageways first passage from inlets for fuel gas thereto to said outlets for anode exhaust gas therefrom.

8. A system as claimed in claim 5, in which a reforming reaction number is provided such that the or at least part of the reforming reaction takes place outside the first passageways.

9. A system as claimed in claim 5, in which said hydrocarbon gas comprises methane.

10. A system as claimed in claim 5, in which said fuel gas comprises natural gas.

11. A system as claimed in claim 1, in which the cathode exhaust gas emerging from the second group of said second passageways has a first composition which differs from a second composition of the cathode exhaust gas emerging from the first group of said second passageways.

12. A system as claimed in claim 1, in which the mass flow rate of gas through the second group of said second passageways is greater than the mass flow rate of gas through the first group of said second passageways.

13. A system as claimed in claim 1, in which the third passageways comprise an inlet manifold common to all the first passageways to supply simultaneously to said first passageways the fuel gas and said anode exhaust gas from the second group of said first passageways.

14. A system as claimed in claim 1, in which the fourth passageways comprise an inlet manifold common to all the second passageways to supply simultaneously to said second passageways the oxidizing gas and said cathode exhaust gas from the second group of said second passageways.

15. A system as claimed in claim 1 in which each fuel cell comprises a solid oxide fuel cell or a molten carbonate fuel cell.

16. A system as claimed in claim 1 in which said fuel cells are disposed so as to form a cross-flow stack of fuel cells.

17. A system as claimed in claim 16, wherein an upstream portion of said second is in close thermal contact with the first group of said first passageways and a downstream portion of said second passageways is in close thermal contact with the second group of said first passageways.

18. A system as claimed in claim 2 in which a mass flow rate of gas through the second group of said first passageways is greater than the mass flow rate of gas through the first group of said first passageways.

19. A system as claimed in claim 3 in which a mass flow rate of gas through the second group of said first passageways is greater than the mass flow rate of gas through the first group of said first passageways.

20. A system as claimed in claim 2 in which the fuel gas comprises at least one hydrocarbon gas convertible to molecular hydrogen by a reforming reaction.

* * * * *